United States Patent [19]

Barker et al.

[11] Patent Number: 4,896,166

[45] Date of Patent: Jan. 23, 1990

[54] REPLACEABLE THERMAL PRINT HEAD ASSEMBLY

[75] Inventors: Robert A. Barker; Jonathan J. Burnard, both of Brookline; Thomas A. Davis, Nashua; Danny J. Prats; Melanie L. Seat, both of Milford, all of N.H.

[73] Assignee: Dataproducts Corporation, Woodland Hills, Calif.

[21] Appl. No.: 175,401

[22] Filed: Mar. 30, 1988

[51] Int. Cl.[4] .................................... G01D 5/10

[52] U.S. Cl. .......................... 346/76 PH; 400/120; 346/139 R

[58] Field of Search .................. 346/76 PH, 139 R; 400/120 PH, 175

[56] References Cited

U.S. PATENT DOCUMENTS 4,768,041 8/1988 Sato et al. .................. 346/76 PH

*Primary Examiner*—B. A. Reynolds
*Assistant Examiner*—Huan Tran
*Attorney, Agent, or Firm*—Spensley Horn Jubas & Lubitz

[57] ABSTRACT

A print head assembly includes the feature of snap-in, tool-less replaceability. The print head is intended for an application where extended use is expected and replacement, due to wear, will be necessary by nontechnical users of the printing system. In one embodiment, the print head utilizes two pins which slide into slots formed in the printer body. The print head is free to pivot about the two pins and is urged against a platen by the force of bias springs and a loaded pin. The loaded pin engages with; and forces upwrd on the heat-radiating fins extending from the bottom of the print head. Shelves formed in the printer body cover engage the two pins of the print head and force the print head, against the forces of the bias springs, into a proper alignment position when the cover is closed. This allows firm engagement of the print head with the platen, and proper alignment thereof, without fixing the print head to a mounting structure.

13 Claims, 4 Drawing Sheets

REPLACEABLE THERMAL PRINT HEAD ASSEMBLY

BACKGROUND OF THE INVENTION

1. Field of the Invention

The present invention relates to a replaceable print head, and in particular to a replaceable print head for use on a printing system such as a thermal transfer printer.

2. Description of the Related Art

Stationary print heads of a type which have a print line comprising a plurality of heating resistors are commonly employed in thermal transfer printers. These devices operate by urging the heating resistors against an ink ribbon. The ink ribbon is thereby urged against the document as the document is driven across the print head assembly. Selective heating of the resistors allows the ink from the ink ribbon to be selectively transferred to the document.

Printing systems which employ a printing head, such as thermal transfer printers, have been found to be particularly troublesome with regard to replacing the print head. During the life of such printing systems, it may become necessary to replace a worn or defective print head with a new one. However, the replacement of a print head, and in particular a thermal transfer print head, has heretofore been a complicated and time-consuming procedure which often requires the help of a trained technician.

Printing systems have been known to employ replaceable print heads having four or more outwardly extending mounting pins. These systems utilize intricate mounting structures which require complicated mounting and alignment procedures in order to replace the print head.

These replacement procedures have been especially complicated in thermal transfer printers due to the fact that the print head in such printers must always maintain a tight contact with both the ink ribbon and the document to be printed in order to reduce heat resistance and to facilitate ink transfer from the ribbon onto the document. Further complications arise by the fact that a highly accurate alignment of the print head with the document and with a platen must be maintained in order to insure that even, unfluctuating printing occurs at correct locations on the document.

The procedure for replacing a print head has heretofore required complex mounting and alignment steps which often must be performed by skilled technicians employing specialized tools. Such procedures have proved to be extremely costly and inefficient. As a result, the use of thermal transfer printers has been found to be impractical in conditions where the printers are operated by persons having little or no technical training, such as with airline ticketing agencies, theater ticketing agencies and the like.

It is therefore an object of the present invention to provide a thermal transfer printing system which is practical for use in conditions such as airline ticketing, theater ticketing, and the like.

It is also an object of the present invention to provide a printing system wherein a replaceable print head can be replaced by a quick and simple procedure requiring little or no technical skills.

Another object of the present invention is to provide a printing system wherein a replaceable print head can be replaced without the use of tools.

It is further an object of the present invention to provide a printing system wherein a replaceable print head can be aligned with respect to the printing system by a quick and simple procedure requiring little or no technical skills.

It is further an object of the present invention to provide a printing system wherein a replaceable print head can be aligned with respect to the printing system without the use of tools.

It is yet a further object of the present invention to provide a printing system wherein a replaceable print head can be repeatedly and accurately aligned in a specific alignment arrangement with respect to the printing system by a quick and simple procedure.

These and other objectives are achieved in the present invention by means as will be described below.

SUMMARY OF THE INVENTION

The print head assembly according to the present invention includes the feature of slide-in, tool-less replaceability and alignment. The print head is intended for an application in which replacement of the print head, due to wear, will be performed by nontechnical users of the printing system.

In the preferred embodiment of the present invention, replacement of the print head involves two steps: seating of the print head in the printer body, and aligning the print head with respect to the printer body and a platen. Seating of the print head in the printer body may be accomplished in the following manner:

The print head of the preferred embodiment includes two pins which slide into slots formed in the printer body. With the pins slid into the slots, the print head is free to pivot about the axis defined by the pins. However, bias springs and a spring-loaded pin, disposed within the printer body, are positioned to abut and exert a force on the bottom surface of the print head. This force exerted on the bottom surface of the print head acts to support the print head when the print head pins are slid into the printer body slots. In this manner, the print head is seated within the printer body merely by sliding the print head into the printer body slots.

After the print head has been seated in the printer body, the print head must be aligned with respect to the printer body and with respect to a platen. The alignment procedure is accomplished in the following manner.

The printer of the preferred embodiment of the present invention employs a printer cover adapted to open and close over the printer body. The printer cover of the preferred embodiment includes shelves formed therein and a platen disposed at a specific distance from the shelves. When the cover is closed over the printer body the shelves in the printer cover engage the two pins of the print head and automatically force the print head, against the forces of the bias springs, into a proper alignment position. This allows firm engagement of the print head with the platen, and proper alignment thereof, without fixing the print head to a mounting structure. In this manner, the print head is aligned with respect to the printer body and the platen merely by closing the cover.

Thus, the seating of the print head and the alignment thereof are accomplished by simple procedures (i.e., sliding the print head pins into the printer body slots and closing the printer cover) that require no specialized tools or technical training. It therefore follows that the print head and the printer of the present invention can be readily employed in conditions where users having little or no technical training may operate the printer and may need to replace the print head of the printer. Such conditions include ticketing counters at airlines, theaters, sports events, and the like.

BRIEF DESCRIPTION OF THE DRAWINGS

A detailed description of a preferred embodiment of the invention will be made with reference to the accompanying drawings wherein like numerals designate corresponding parts in the several Figures.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
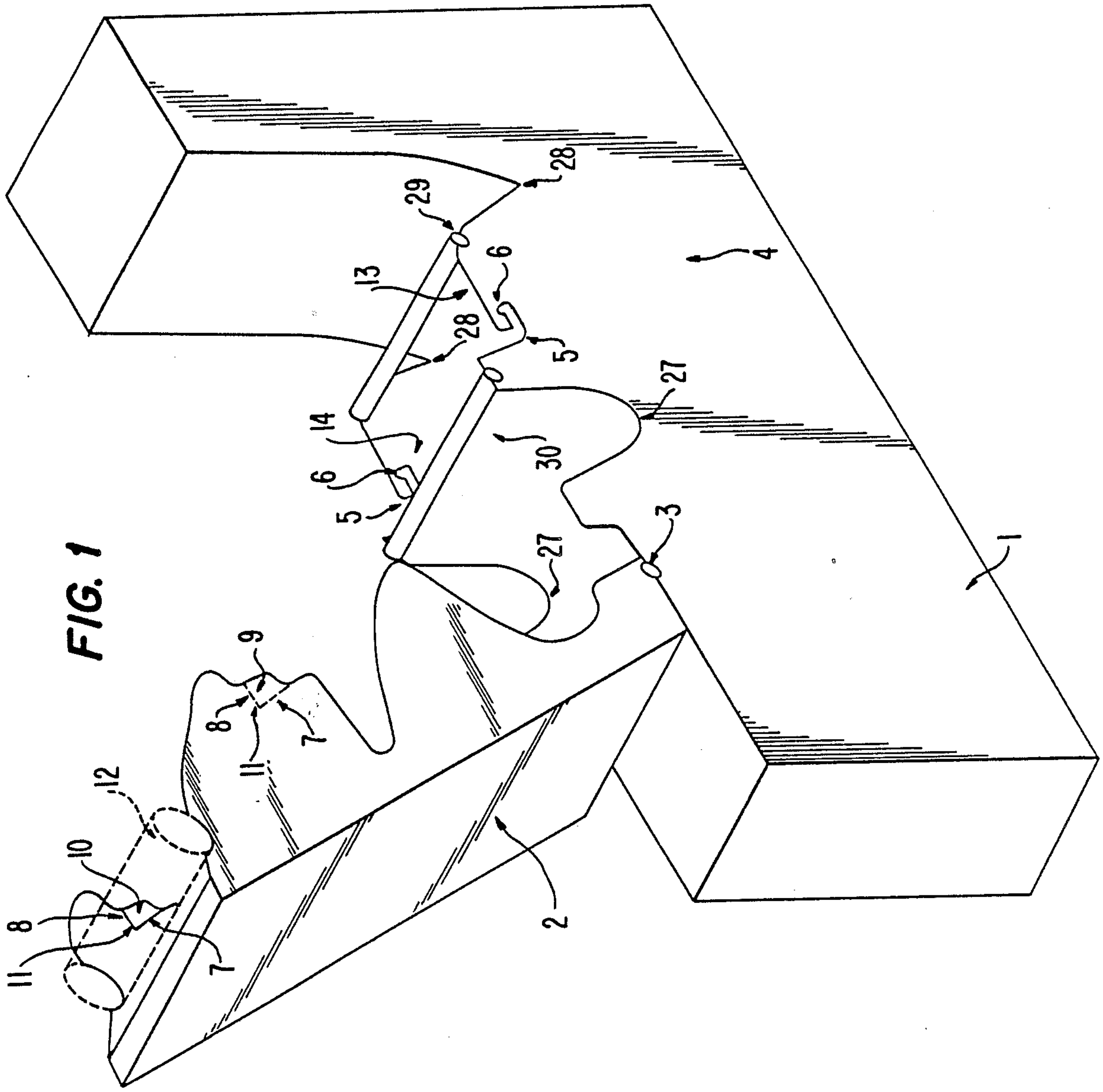
FIG. 1 is a perspective view of the printer body according to an of the present invention.

Referring to FIG. 1, reference numeral 1 designates the printer body of the printing system of the preferred embodiment. The printer body 1 includes a cover 2 hingeably secured thereto by suitable hinge means. Disposed within the cover 2 is a platen 12 (shown in broken lines in FIG. 1 and in solid lines in FIG. 4). The printer body 1 also includes a print station, generally designated at 4, for accommodating the thermal print head 15 (FIG. 2) described below.

The print station 4 includes two hook-shaped slots 5 located on either side of the printer body 1. Two pins 18 (FIG. 2) extending from either side of the print head 15 are adapted to slide into the slots 5. In this manner, the print head 15 is adapted to be disposed inside of the printer body 1 and be pivotable about the axis defined by the two pins 18.

Figure 2:
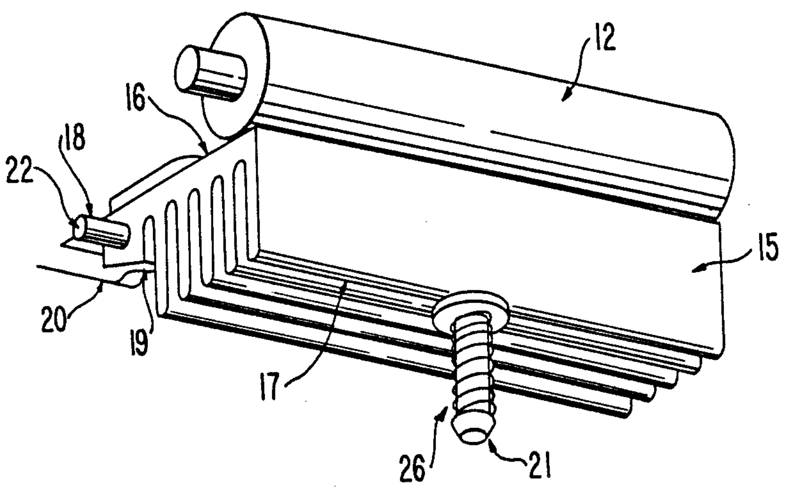
FIG. 2 is a perspective view of the print head according to an embodiment of the present invention.

Referring to FIG. 2, reference numeral 15 designates the print head of the preferred embodiment. The print head 15 is a thermal print head having, on its upper surface 16 (with respect to FIGS. 2 and 3), a print line. In the preferred embodiment, the print line is formed of a row of resistors, with approximately 150 resistors-per-inch. Selective energization of the resistors causes selective heating and, thereby, selective transferring of ink from a ribbon laying across the resistors onto a document, as described below.

Figure 5:
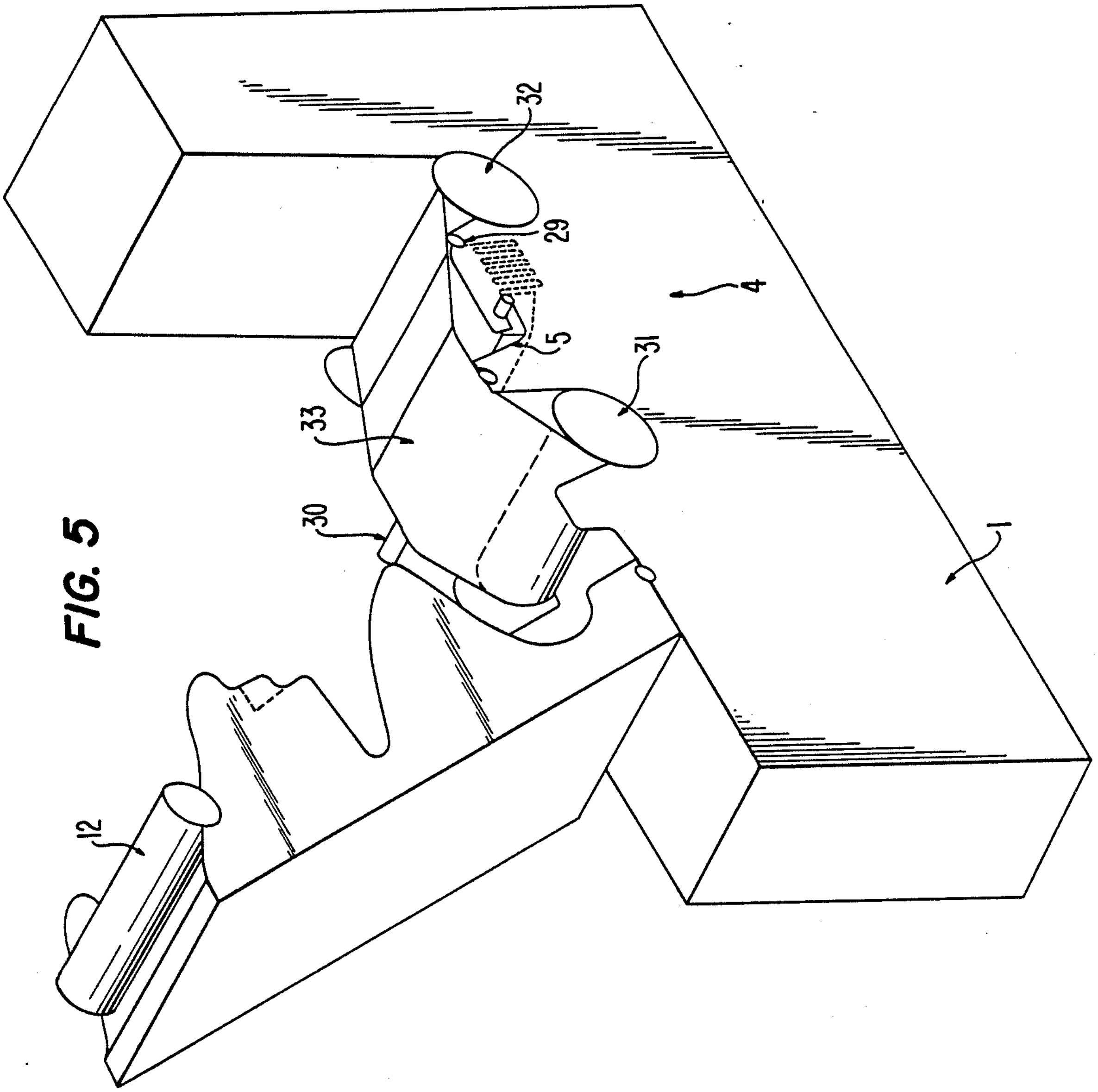
FIG. 5 is a perspective view of the printer of the embodiment of FIG. 4 with ribbon supply and take-up spools provided.

The sides 13 and 14 of the print body 1 are each provided with two depressions, 27 and 28. As shown in FIG. 5, the depressions 27 are adapted to rotatably support a ribbon take-up spool 31, while depressions 28 are adapted to rotatably support a ribbon supply spool 32. The ribbon 33 extends between the ribbon take-up spool 31 and the ribbon supply spool 32. The ribbon 33 is arranged to lay over a first capstan 29, the print line of the print head 15, and a second capstan 30. The document to be printed (not shown) is driven by suitable document drive means (also not shown) across the portion of the ribbon which extends over the print line of the print head. Selective heating of the print line resistors causes transferring of ink from the portion of the ribbon laying directly over the heated resistors to a document being driven across the other side of the ribbon with respect to the print head.

Extending from the lower surface (with respect to FIGS. 2 and 3) of the print head 15 are a plurality of heat dissipating fins 17. The heat fins 17 are arranged to dissipate heat which builds up on the print head 15 during printing operations. The heat fins 17 allow the print head 15 to operate at a cooler temperature, thereby reducing the effect of "trailing" or "bleeding." This may occur when a resistor is not energized, but is still hot enough from previous energizations to cause ink to be transferred onto the document. The use of such heat fins is especially beneficial for systems which print graphics and, thus, require repetitive energization of a number of resistors, thereby producing a great deal of heat.

The heat fins 17 also allow the print head 15 to effectively operate in an enclosed environment, inside of the printer body 1, where higher than usual ambient temperatures may exist. The heat fins 17, further, provide structural support for the thin print head 15, making the print head 15 more rigid and thus easier to handle without causing damage to the print head. Another function of the heat fins 17 is to provide a surface on which the loaded pin 21 exerts an upward (with respect to FIGS. 2 and 3) directed force, as will be described below.

Two pins 18 protrude outward from either side of the print head 15. The pins 18 are adapted to slide into the slots 5 (FIG. 1) disposed on both sides 24 and 25 of the printer body 1. The print head 15 used can, thereby, be seated inside of the printer body 1 with pins 18 slid into, and extending through, the slots 5. With the print head 15 seated in the printer body 1, the sides 24 and 25 of the printer station 4 define the limits of the print head's lateral position with respect to the printer body. In this manner, merely by sliding the pins 18 into the slots 5, the print head 15 is seated within the printer body 1, is pivotable about the axis defined by pins 18, and is positioned laterally by the sides 24 and 25 of the printer body.

With the print head 15 seated inside of the printer body 1, a portion of each pin 18 extends through one of the respective slots 5 and protrudes outward from the printer body 1 by a specified distance. The portion of the pin 18 extending outward form the printer body 1 is positioned to about shelves 7 and 8, which are disposed on the printer cover 2, when the cover is closed. This feature of the invention will be discussed in greater detail below.

Figure 3:
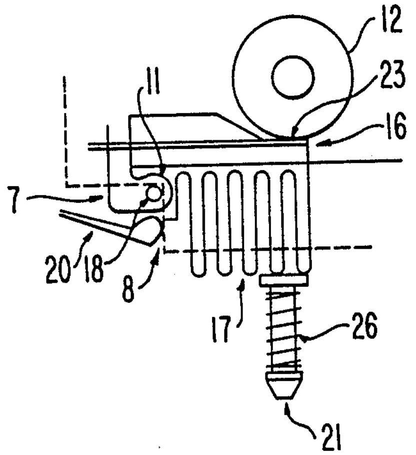
FIG. 3 is a side view of the print head shown in FIG. 2, with dashed lines indicating the position of the shelves 6 and 7 when the printer cover is closed.
Figure 4:
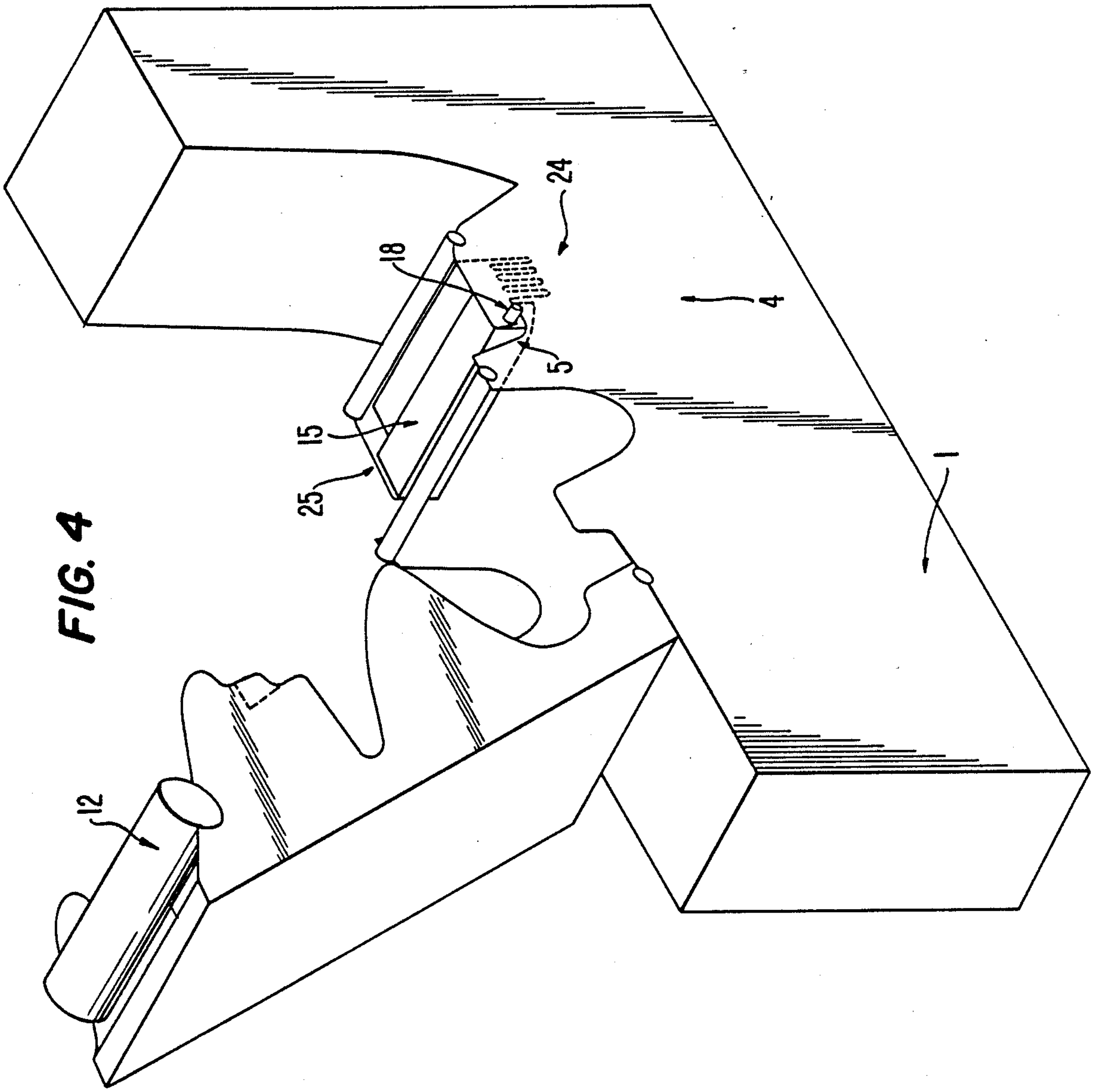
FIG. 4 is a perspective view of the printer body with the print head seated therein according to an embodiment of the present invention.

The surface 19 of the print head 15, which is located directly below (with respect to FIGS. 2 and 3) the pins 18 is sloped. This sloped surface 19 provides a surface against which bias springs 20 exert a biasing force. The bias springs 20 are disposed inside of the printer body 1 and are positioned to abut the sloped surface 19 when the print head is seated within the printer body as previously described. The slope of the surface 19 allows the bias springs 20 to exert an upward directed force, as well as force directed outward from the paper with respect to FIG. 2 (or to the right with respect to FIG. 3). In this manner, the print head, when seated in the printer body 2 as shown in FIG. 4, will be forced upward and inward, into the plane of the drawing, with respect to FIG. 4. The pins 18 will thereby be automatically forced into the hook portions 6 of slots 5 (see FIGS. 1 and 3) when t print head 15 is seated inside of the printer body 1.

Thus, the procedure for seating the print head 15 in the print station 4 requires that a user merely slide the pins 18 of the print head into the slots 5 of the print station. Upon doing so, the bias springs 20 will automatically force the pins 18 into the hook portions 6 of the slots 5, and the sides 24 and 25 will automatically laterally align the print head 15 with respect to the printer body 1. This simple procedure can be performed by users having little or no technical training. Furthermore, this procedure may be accomplished without the use of tools.

FIG. 4 depicts the print head 15 seated inside of the print station 4 of the printer body 1. As shown in FIG. 4, the pins 18 are forced into the hook portions 6 of the slots 5 and extend through the slots 5 and outward form the sides 24 and 25 by a predetermined distance. The broken lines in FIG. 4 depict the position of the print head within the printer body, looking through side 24.

The printer cover 2 includes shelves 7 and 8 located on both sides of the inside surface of the cover (see FIG. 1). When the cover 2 is closed over the printer head 15, the shelves 8 and at least one of the shelves 7 abut and push the pins 18 away from the hook portions 6 of the slots 5. The force applied to the pins 18 by the shelves 8 and at least one of the shelves 7, thus, is directed opposite to the direction of the force applied to the pin 18 by the bias springs 20. In this manner, when the cover 2 is closed, the bias springs 20 force the pins 18 against the shelves 8 and at least one of the shelves 7. Additionally, the shelves 8 and at least one of the shelves 7 force the print head surface 19 against the bias springs 20.

A loaded pin 21 is disposed inside of the printer body 1 and is biased by a spring 26. The loaded pin 21 is positioned to abut and exert an upward directed force (with respect to FIGS. 2 and 3) on the bottom surface (also with respect to FIGS. 2 and 3) of the print head 15. The loaded pin 21 abuts the surface of the print head 15 which is located below, and facing opposite, the surface 16 having the print line of resistors thereon (see FIG. 3). As shown in FIGS. 2 and 3, the loaded pin 21 abuts the heat fins 17 which extend from the lower surface (with respect to FIGS. 2 and 3) of the printer head 15. The loaded pin 21 abuts the center (with respect to the lateral length) of the heat fins 17 which are located on the side of the lower surface (with respect to FIGS. 2 and 3) opposite to the side of the lower surface (with respect to FIGS. 2 and 3) which has the sloped surface 19. With the pins 18 engaged in the slots 5, the loaded pin 21 forces the print head 15 into a slight counter clockwise (with respect to FIGS. 2 and 3) movement about the axis defined by pins 18.

Disposed within the cover 2 is a platen 12. When the cover 2 is closed, the platen 12 will contact and push down (with respect to FIGS. 1-3) on the print line surface 16 of the print head 15. The downward (with respect to FIGS. 1-3) directed force of the platen 12 on the print line surface 16 is, thus, directed against the force of the loaded pin 21. Thus, the force of the platen 12 on the upper surface 16 is directed opposite to that of the loaded pin 21 on the heat fins 17, and, as previously described, the force of the shelves 8 and at least one of the shelves 7 on the pins 18 is directed opposite to that of the bias springs 20 on the surface 19. Also, since the loaded pin 21 is centrally located with respect to the heat fins 17, the force of loaded pin 21 is evenly distributed over the length of the print line surface 16.

The shelves 8 and at least one of the shelves 7, disposed in the cover 2, provide a vertical surface and a horizontal surface, respectively, against which the pins 18 are forced by the action of the bias springs 20. By closing the cover 2, the pins 18 are automatically forced against the shelves 8 and at least one of the shelves 7, as previously described, and also against the side wall 9 of the cover 2 by action of a head side load spring 10.

The side wall 9 is formed in one side of the cover 2 and the head side load spring 10 is mounted opposite it in the other wall. The side wall 9 has an inside surface which faces toward the interior of the printer body 1. When the cover 2 is closed, one of the ends 22 of the print head pin 18 abuts the inside surface of the wall and the other abuts the inside surface of the spring. With the cover 2 closed, one pin end 22 will be abutted against the inside surface of the side wall 9 by the action of the spring 10 and will, thereby, be located and restricted from lateral movement with respect to the printer body 1. In this manner, merely by closing the cover 2, the print head 15 will automatically be forced into a specific lateral alignment with respect to the printer body 1. Such alignment will not be changed, even when a replacement print head is inserted in the printer body. Thus, the same lateral alignment is repeated for each replaced print head merely by seating the replacement printer head in the printer body, as previously described, and closing the cover 2.

Furthermore, upon closing of the cover 2, the print head 15 will automatically attain a correct alignment with the platen 12 disposed in the cover. This automatic alignment occurs because the shelves 7 and 8, against which the pins 18 are forced, is disposed at a specific fixed distance from the print head contacting the point 23 of the platen 12 and because the loaded pin 21 (FIG. 2) applies a centrally located upward force on the print head. The aforementioned specific fixed distance is equal to the distance between the pins 18 and the print line of the print head. In this manner, the platen 12 will always tangentially contact the print line of the print head, as shown in FIG. 3, when the pins are forced into contact with shelves 8 and at least one of the shelves 7, and when the print head is forced against the platen 12 with the centrally located force from the head loaded pin 21.

Adjustments as to the degree of force exerted on the print line by the platen 12 may be made during the manufacture of the printer body 1 by the selection of spring 26. In this manner, a specific force between the platen 12 and the print line, and an exact alignment, is automatically attained each time the cover 2 is closed over a print head 15, following the replacement of an old print head with a new one. Thus, a user of the printing system will be insured of having a constant and correct force between the platen and the print head and the correct alignment of the printer head, merely by closing the cover 2. No adjusting of this force will be required of the user. Furthermore, this exact force and alignment will be repeated for each replaced print head. Moreover, by providing a constant and equal degree of force between the platen and the print line for each print head, the system will produce an even and unfluctuating print, even after one print head has been replaced by a second print head.

Therefore, tool-less replacement and alignment of the print head is affected merely by opening cover 2, sliding pins 18 of the old print head out from slots 5, sliding pins 18 of a new print head into slots 5, and closing the cover. This simple procedure does not require the use of tools and can be performed by those without technical training. Furthermore, this simple procedure can be carried out each time a print head is replaced; the alignment and position of a replacement print head will automatically be an exact repeat of the alignment and position of the print head being replaced.

The simplicity of performing the procedures for replacing the print head of the present invention enables operators having little or no technical skills to replace the print head when required. The printing system which employs the print head of the present invention is, thus, practicable for use in conditions where persons having little or no technical skills operate the system.

It will be recognized that words such as upward, downward, upper, and lower, appearing in the foregoing description are used in conjunction with the figures merely to aid in the description of the invention and are not intended to limit the invention in any way.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

We claim:

1. A printing system for printing documents, comprising:

a printing station having an open-ended slot formed on each of two sides thereof;

a replaceable print head having a pin protruding from each of two sides thereof adapted to be inserted into the open ends of said slots and to slide into said slots;

alignment means, engageable with said pins when slid into said slots, for aligning said print head with respect to the printing station and the documents to be printed.

2. A printing system for printing documents, comprising:

a printing station having a slot formed on each of two sides thereof;

a replaceable print head having a pin protruding from each of two sides thereof adapted to slide into said slots;

alignment means, engageable with said pins when slid into said slots, for aligning said print head with respect to the printing station and the documents to be printed;

a movable member, movable between a first and a second position;

wherein said alignment means is engaged with said pins when said movable member is moved to said first position, and is disengaged when said movable member is moved to said second position.

3. A printing system as claimed in claim 2, wherein said movable member comprises a cover adapted to cover, at least partially, said printing station when moved to said first position, and to expose, at least partially, said printing station when moved to said second position.

4. A printing system as claimed in claim 3, wherein said alignment means comprises shelves disposed on said cover.

5. A printing system as claimed in claim 4, further comprising:

a platen disposed on said cover at a specific distance from said shelves;

a print line disposed on said print head at a specific distance from said pins; wherein said specific distance from said shelves to said platen corresponds to said specific distance from said pins to said print line such that said platen tangentially contacts said print line when said pins engage said shelves.

6. A printing system for printing documents, comprising:

a printing station having a slot formed on each of two sides thereof;

a replaceable print head having a pin protruding from each of two sides thereof adapted to slide into said slots;

alignment means, engageable with said pins when slid into said slots, for aligning said print head with respect to the printing station and the documents to be printed;

a platen;

heat fins extending from said print head for dissipating heat built up on said print head during printing operations; and biasing means exerting a force on said heat fins for urging said print head against said platen.

7. A printing system, comprising:

a printer body;

a displaceable cover, displaceable in a first position for covering, at least partially, said printer body, and displaceable in a second position for exposing, at least partially, said printer body;

a removable print head;

a print station, disposed on said printer body, having means for seating said print head thereon; and alignment means disposed on said displaceable cover for aligning said print head seated on said print station when said cover is displaced to said first position.

8. A printing system, comprising:

a printer body;

a print head;

seating means for tool-less insertion and seating of said print head on said printer body;

alignment means for tool-less alignment of said print head.

9. A printing system comprising:

a print head supporting member provided with first and second slots;

a replaceable print head having first and second outwardly extending members adapted to fit within the first and second slots; and a movable member, movable between a first and a second position, the movable member having first and second abutting portions adapted to respectively abut the first and second outwardly extending members of the print head and to thereby align the print head with respect to the print head supporting member upon the outwardly extending members being fitted within the slots and upon the movable member being moved to the first position.

10. A printing system as claimed in claim 9, wherein the first and second outwardly extending members comprise first and second pins, respectively.

11. A printing system as claimed in claim 9, wherein the first and second slots are each provided with an open end in which one of the outwardly extending members may be inserted.

12. A printing system as claimed in claim 9, wherein the movable member comprises a movable cover for the print head supporting member, the first position comprises a closed position wherein the cover is substantially closed with respect to the print head supporting member, and the second position comprises an open position wherein the cover is substantially opened with respect to the print head supporting member.

13. A printing system as claimed in claim 12, wherein the first and second abutting portions comprise first and second shelf arrangements, respectively, provided within the movable cover.

* * * * *